(12) United States Patent
Miura

(10) Patent No.: US 9,850,933 B2
(45) Date of Patent: Dec. 26, 2017

(54) CLIP

(71) Applicant: NIFCO INC., Yokosuka-shi, Kanagawa (JP)

(72) Inventor: Sohei Miura, Yokosuka (JP)

(73) Assignee: NIFCO INC., Yokosuka-shi, Kanagawa (JP)

(*) Notice: Subject to any disclaimer, the term of this patent is extended or adjusted under 35 U.S.C. 154(b) by 0 days.

(21) Appl. No.: 15/023,212

(22) PCT Filed: Sep. 9, 2014

(86) PCT No.: PCT/JP2014/073823
§ 371 (c)(1),
(2) Date: Mar. 18, 2016

(87) PCT Pub. No.: WO2015/041103
PCT Pub. Date: Mar. 26, 2015

(65) Prior Publication Data
US 2016/0223003 A1 Aug. 4, 2016

(30) Foreign Application Priority Data
Sep. 19, 2013 (JP) ................. 2013-194431

(51) Int. Cl.
*F16B 13/06* (2006.01)
*F16B 19/10* (2006.01)
*F16B 5/06* (2006.01)

(52) U.S. Cl.
CPC ........ *F16B 19/1081* (2013.01); *F16B 5/0642* (2013.01)

(58) Field of Classification Search
CPC .................................................. F16B 19/1081
(Continued)

(56) References Cited

U.S. PATENT DOCUMENTS 4,952,106 A 8/1990 Kubogochi et al.
5,286,152 A * 2/1994 Anderson ........... F16B 19/1081
411/41

(Continued)

FOREIGN PATENT DOCUMENTS

EP 2600014 A1 6/2013
JP S63-163011 A 7/1988
(Continued)

OTHER PUBLICATIONS

PCT International Search Report of PCT/JP2014/073823.
Europe Patent Office, "Search Report for European Patent Application No. 14846157.7," dated Mar. 23, 2017.

*Primary Examiner* — Gary W Estremsky
(74) *Attorney, Agent, or Firm* — Manabu Kanesaka

(57) ABSTRACT

A clip includes a grommet having a projecting portion and a plurality of leg portions extending from the projecting portion, and a shaft member including a head portion, and a shaft portion extending from the head portion, and inserted into an inside of the leg portions to laterally expand the leg portions. The clip is switchable between a lock position to expand the leg portions laterally, and an unlock position where the shaft member is further pushed to return the leg portions to an original condition. Each leg portion includes a leg-side convex portion, a convex-portion wall face, and a guide portion. The shaft portion includes a shaft-side convex portion engaging the leg-side convex portion, a concave portion provided between the shaft-side convex portion and the head portion, and engaging the leg-side convex portion to return the leg portion to the original condition, an abutment portion, and a release portion.

7 Claims, 10 Drawing Sheets

(58) Field of Classification Search
USPC .......................... 411/45, 46, 48, 51; 24/458
See application file for complete search history.

(56) References Cited

U.S. PATENT DOCUMENTS

| | | | |
|---|---|---|---|
| 7,862,272 B2* | 1/2011 | Nakajima | F16B 19/1081 411/41 |
| 8,956,095 B2* | 2/2015 | Sato | F16B 19/1081 24/458 |
| 9,086,084 B2 | 7/2015 | Watanabe | |
| 2005/0220561 A1 | 10/2005 | Okada | |
| 2010/0162534 A1 | 7/2010 | Kato | |
| 2013/0145585 A1 | 6/2013 | Watanabe | |

FOREIGN PATENT DOCUMENTS

| | | |
|---|---|---|
| JP | H02-47414 U | 3/1990 |
| JP | H05-66309 U | 9/1993 |
| JP | 2004-239316 A | 8/2004 |
| JP | 2007-056895 A | 3/2007 |
| JP | 2012-26553 A | 2/2012 |
| JP | 2012-062922 A | 3/2012 |

\* cited by examiner

Fig. 1(a)
Fig. 1(b)
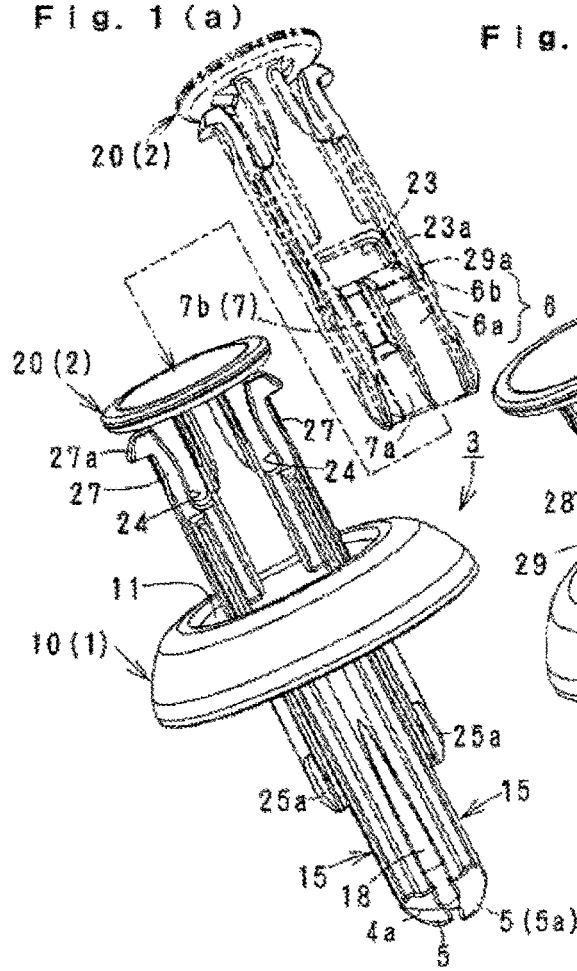
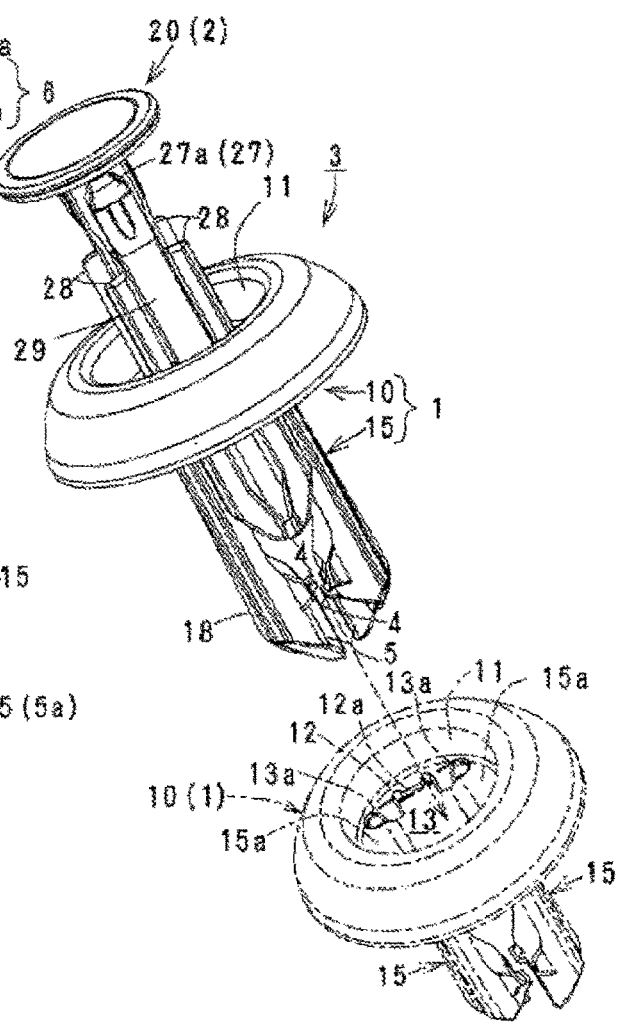

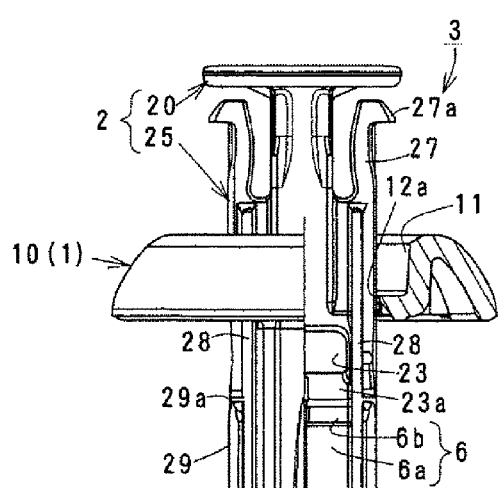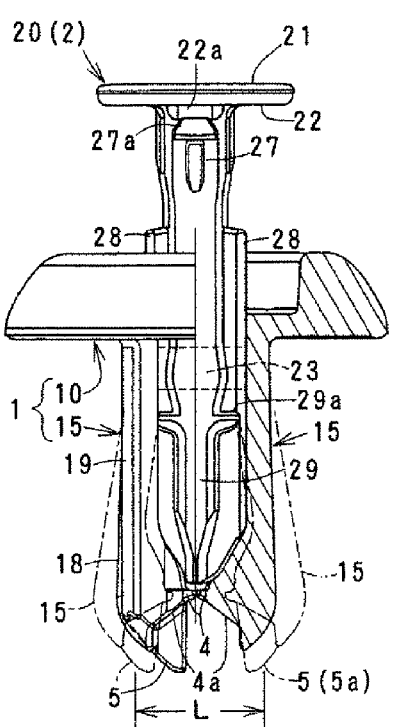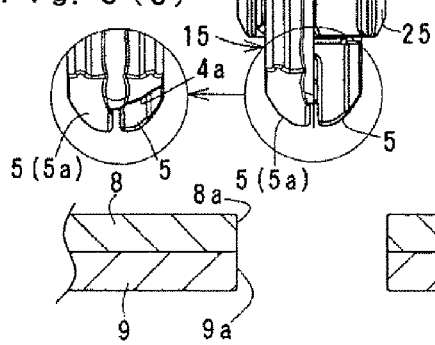

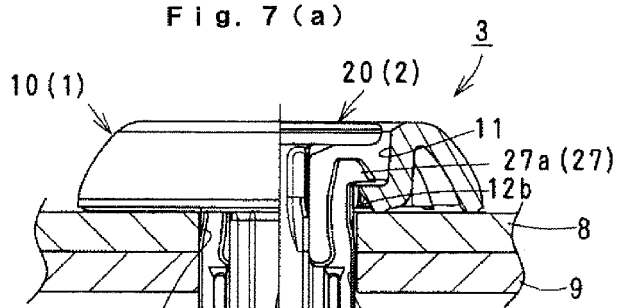
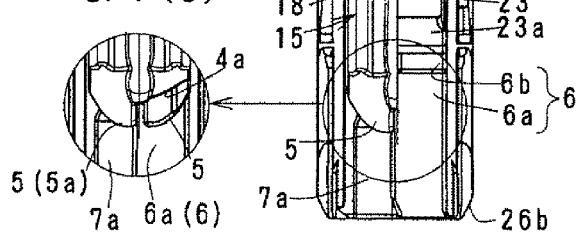
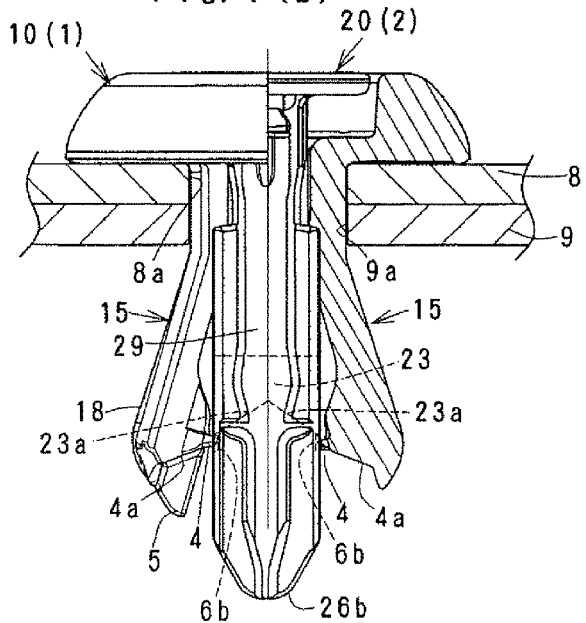

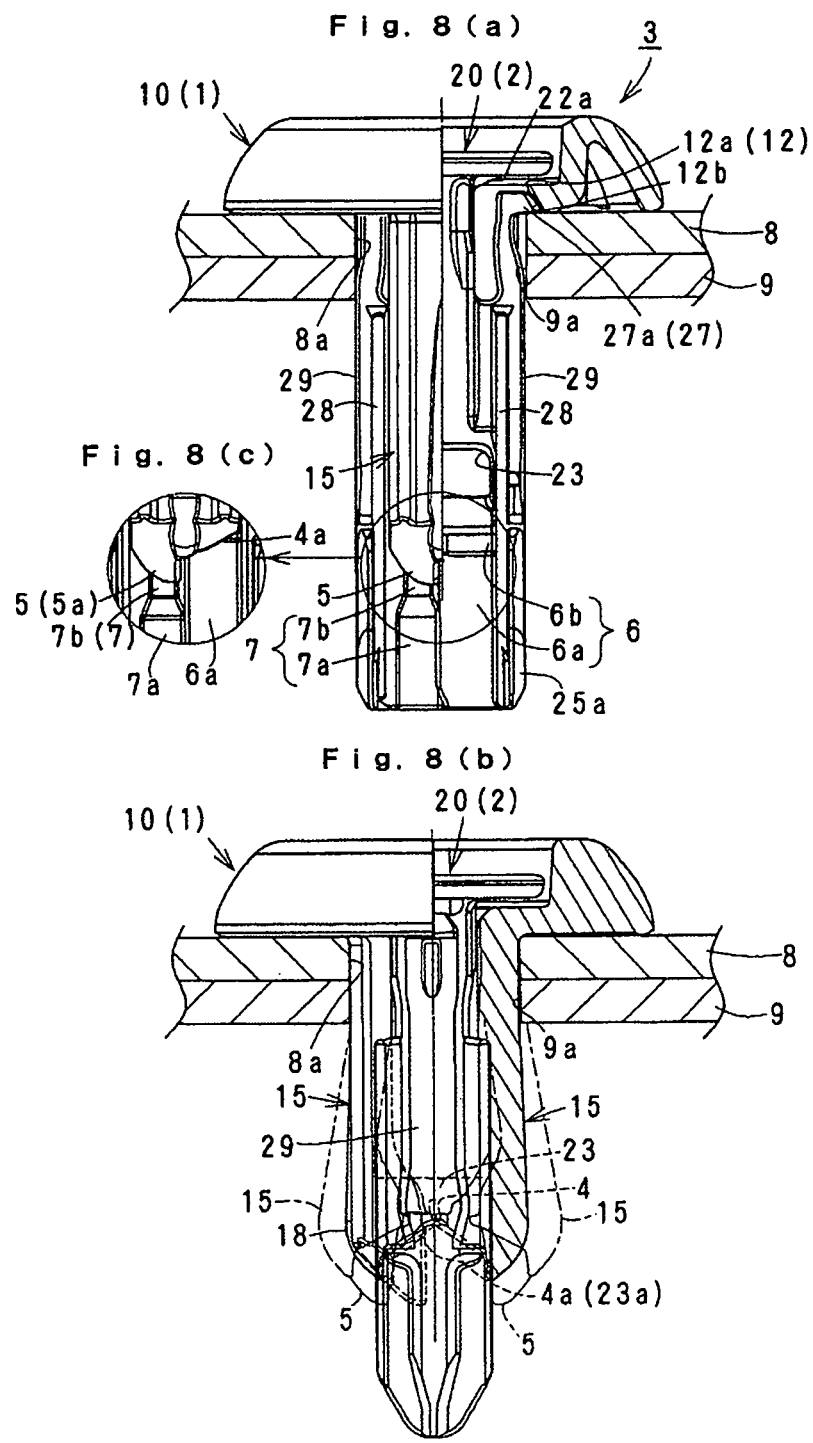

CLIP

CROSS-REFERENCES TO RELATED APPLICATIONS

The present application is National Phase of International Application No. PCT/JP2014/073823, and claims priority from Japanese Patent Application No 2013-194431 filed on Sep. 19, 2013, the disclosure of which is incorporated herein.

FIELD OF TECHNOLOGY

The present invention relates to a clip with a two-piece type formed of a grommet and a shaft member, and especially, a clip which can switch between a lock position wherein when the shaft member is pushed into the grommet for a predetermined amount, leg portions of the grommet are diametrically expanded, and an unlock position wherein when the shaft member is further pushed in, the leg portions can return to an original condition.

BACKGROUND ART

FIGS. 9(a) and 9(b) show a clip disclosed in Patent Document 1. The clip 10 comprises a grommet 12 provided with a base portion (corresponding to a projecting portion in the present application) 20 abutting against a periphery of a first attachment hole 34 bored in a member 30, and a trunk portion (corresponding to the leg portions of the present application) 22 diametrically expandably extending from the base portion, and formed by a plurality of trunk-portion formation pieces 52 inserted into the first attachment hole 34 and a second attachment hole 36 bored in a member 32; and a pin (corresponding to the shaft member in the present application) 14 provided with a head portion 24, and a shaft portion 26 extending from the head portion, and inserted to an inside of the trunk portion from a through hole of the base portion 20 to diametrically expand the trunk-portion formation pieces 52 so as to push the trunk-portion formation pieces against a hole wall side of the second attachment hole 36. The aforementioned clip 10 can switch between a lock position where the shaft member 14 is pushed into the grommet 12 for the predetermined amount to diametrically expand the trunk-portion formation pieces 52 in a state wherein engagement convex portions (corresponding to a leg-side convex portion in the present application) 54 provided on a trunk-portion formation piece side as shown in FIG. 9(a) are engaged with tip-side engagement concave portions (corresponding to a shaft-side convex portion of the present application) 40 provided on a shaft portion side; and an unlock position where when the shaft member 14 is further pushed in to the maximum degree, the engagement convex portions 54 release the engagement as shown in FIG. 9(b), and fall into head-portion-side engagement concave portions 44 provided on the shaft portion side for engagement so as to return the trunk-portion formation pieces 52 to the original condition.

Also, in the Patent Document 1, in order to obtain excellent workability when the pin 14 is returned to an upward position which is reusable relative to the grommet 12 from the condition of FIG. 9(b), the engagement convex portions 54 include convex-portion wall faces 54A inclining in an inward direction from a trunk-portion tip side, and convex-portion wall faces 54B inclining in a trunk-portion inward direction from a base portion side. Also, the head-portion-side engagement concave portions 44 include tip-side-concave-portion wall faces 44A inclining in a shaft-portion inward direction from a tip side, and head-portion-side-concave-portion wall faces 44C inclining in the shaft-portion inward direction from a head portion side. Then, in the condition of FIG. 9(b), if a tip portion of the pin 14 is attempted to be pushed back in a direction of being pulled out, each trunk-portion formation piece 52 can be elastically deformed smoothly in an outward direction accompanied by excellent sliding between the pin-tip-side-concave-portion wall faces 44A and the grommet-convex-portion wall faces 54A.

PRIOR ART DOCUMENT

Patent Document

Patent Document 1: Japanese Patent Application Publication No. 2012-137130

SUMMARY OF THE INVENTION

Problems to be Solved by the Invention

In the aforementioned clip structure, in reuse, in the condition of FIG. 9(b), the clip is pulled out from the attachment hole of each member, or is returned to an initial condition wherein the pin is moved upward relative to the grommet until the head portion protrudes from the grommet. When the clip is reused, after the clip is inserted into the attachment hole of each member in the initial condition, the pin is operated to be pushed into a position in FIG. 9(a). However, in this type of clip, if the grommet is placed in a diameter-expansion state as shown in FIG. 9(a) for a long time, as time proceeds, a deformation develops, so that even in the condition of FIG. 9(b), the clip cannot be completely returned to the original condition by a creep phenomenon.

Broken lines in FIG. 9(b) show a positional relation after a diameter expansion thereof by assuming a case wherein the trunk-portion formation pieces are diameter-expanded only for a predetermined amount by such a creep deformation. In a structure being reused, if the trunk-portion formation pieces are creep-deformed in an expanded state, when they are inserted into the attachment hole of each member after being returned to the aforementioned initial condition, the maximum distance between the trunk-portion formation pieces increases more than a hole diameter of the attachment hole, so that the trunk-portion formation pieces become difficult to be inserted into the attachment hole, thereby deteriorating the workability. In such a situation, if there is a burr in the attachment hole, the trunk-portion formation pieces can be easily caught by the burr, thereby further declining the workability.

An object of the present invention is to solve the aforementioned problems, and eliminate a workability decline factor at a reuse time by maintaining an excellent insertion property relative to the attachment hole even if the leg portions of the grommet are creep-deformed in a diameter-expansion condition. Other objects of the present invention will be clarified in the following content explanation.

Means for Solving the Problems

The present inventor has proposed the present invention in order to obtain the aforementioned objects.

The present invention provides a clip comprising a grommet provided with a projecting portion, and a plurality of leg portions diametrically expandably extending from the projecting portion; and a shaft member provided with a head portion, and a shaft portion extending from the head portion, and inserted into an inside of the leg portions from a through hole provided in the projecting portion so as to expand a diameter of the leg portions. The clip is switchable between a lock position where the shaft member is pushed into the grommet for a predetermined amount to expand the diameter of the leg portions, and an unlock position where the shaft member is further pushed in so as to return the leg portions to an original condition. Also, each leg portion includes a leg-side convex portion provided on an inside; a convex-portion wall face forming one portion of the leg-side convex portion, and inclining in a leg-portion inward direction from a leg-portion tip side; and a guide portion extending to the leg-portion tip side from the leg-side-convex-portion forming portion in a state of being provided together with the leg-side convex portion, and inclining from an extending tip side thereof to the inside of the leg portion for easily inserting into an attachment hole for inserting the leg portion. Also, the shaft portion includes a shaft-side convex portion engaging the leg-side convex portion to expand the diameter of the leg portion; a concave portion provided between the shaft-side convex portion and the head portion, and engaging the leg-side convex portion so as to return the leg portion to the original condition from a diameter expansion; an abutment portion abutting against the convex-portion wall face; and a release portion relative to the guide portion.

The grommet and the shaft member of the clip according to the present invention respectively may be a grommet provided with the projecting portion abutting against a periphery of a first attachment hole bored in an attaching member; and the plurality of leg portions diametrically expandably extending from the projecting portion, and inserted into the first attachment hole and a second attachment hole bored in an attached member attaching or connecting the attaching member, and the shaft member provided with the head portion; and the shaft portion extending from the head portion, and inserted into the inside of the leg portions from the through hole provided in the projecting portion to expand the diameter of the leg portions so as to be pushed against a hole wall side of the second attachment hole. Namely, the present invention provides the clip comprising the grommet provided with the projecting portion abutting against the periphery of the first attachment hole bored in the attaching member, and the plurality of leg portions diametrically expandably extending from the projecting portion, and inserted into the first attachment hole and the second attachment hole bored in the attached member attaching or connecting the attaching member; and the shaft member provided with the head portion, and the shaft portion extending from the head portion, and inserted into the inside of the leg portions from the through hole provided in the projecting portion to expand the diameter of the leg portions so as to be pushed against the hole wall side of the second attachment hole. Also, the clip can switch between the lock position where the shaft member is pushed into the grommet for the predetermined amount to expand the diameter of the leg portions, and the unlock position where the shaft member is further pushed in so as to return the leg portions to the original condition. Also, each leg portion includes the leg-side convex portion provided on the inside; the convex-portion wall face forming one portion of the leg-side convex portion, and inclining in the leg-portion inward direction from the leg-portion tip side; and the guide portion extending to the leg-portion tip side from the leg-side-convex-portion forming portion in the state of being provided together with the leg-side convex portion, and inclining from the extending tip side thereof to the inside of the leg portion for easily inserting into each attachment hole. Also, the shaft portion includes the shaft-side convex portion engaging the leg-side convex portion to expand the diameter of the leg portion; the concave portion provided between the shaft-side convex portion and the head portion, and engaging the leg-side convex portion so as to return the leg portion to the original condition from the diameter expansion; the abutment portion abutting against the convex-portion wall face; and the release portion relative to the guide portion.

In the present invention, as for the attaching member and the attached member, there are included a structure wherein one member is superposed on the other member to be attached; a structure wherein both members are connected in a superposed state; and a specification wherein the attaching member or the attached member is formed with two or more as well.

The present invention is more preferable to be embodied as conditions described in the following (A) to (E).

(A) The attachment hole is a circular hole, and the leg portion is formed by two facing each other. In this condition, it is specified that two leg portions are formed, so that, for example, even if the clip is small as in an embodiment, the leg-side convex portion and the guide portion can be easily provided within a width of the leg portion, and it comes to preferable in a structure of a circular hole shape which is generally adopted as the attachment hole.

(B) Each leg portion is provided such that the leg-side convex portion and the guide portion are respectively provided right-and-left alternately, and the shaft portion has a structure such that the release portion corresponding to each guide portion is alternately provided on a different side, and a depth of each release portion reaches an approximately intermediate position of a thickness of the shaft portion. In such condition, when each leg portion provides the leg-side convex portion and the guide portion right-and-left alternately, for example, a guiding operation of each guide portion relative to the attachment hole can be obtained more favorably. Also, the shaft portion can easily provide the release portion corresponding to each guide portion, and the shaft-side convex portion relative to the leg-side convex portion on the different side, namely, alternately on both sides back to back as in the embodiment. Moreover, when the depth of each release portion reaches the approximately intermediate position of the thickness of the shaft portion, the guide portion or the shaft-side convex portion can be formed to be slightly larger according to the depth of the release portion.

(C) The concave portion has a structure formed in the through hole. In this condition, the concave portion of the shaft portion is the through hole so as to relatively increase a protrusion dimension of the leg-side convex portion, so that the maximum diameter-expansion dimension of the leg portion can be easily set arbitrarily, and freedom in design can be expanded.

(D) The shaft member is a structure including a protruding portion extended in an axial direction of the shaft portion, and controlling a relative rotation of the grommet. In this condition, a relative rotation of each leg portion of the grommet is controlled by the protruding portion on a shaft member side so as to move in a linear direction entirely, so that a stable insertion property relative to the attachment hole or a switching operability can be easily maintained.

(E) The shaft member has a structure including an elastic piece provided in the shaft portion, and coming to a fitting state of fitting into an edge portion of the through hole on the projecting portion side in an engagement state between the leg-side convex portion and the shaft-side convex portion, and when the shaft member is pushed into the grommet further, the shaft member passes the edge portion of the through hole accompanied by an elastic deformation so as to move to a lower side of the edge portion. In this condition, the following advantages can be obtained: since the elastic piece fits into the edge portion of the through hole in the lock position of the shaft member so as to easily prevent a possibility of the shaft member from being accidentally switched to the unlock position by an excessive pushing force; and in a process wherein the shaft member is further pushed in to be switched from the lock position to the unlock position, the elastic piece passes the edge portion of the through hole accompanied by the elastic deformation, so that an unlocking force becomes difficult to decline even by repeated operations, and when the elastic piece passes accompanied by the deformation, a switching completion to the unlock position can be easily recognized by a click sound and the like.

Effect of the Invention

In the present invention, in addition to the advantage that as in the Patent Document 1, the clip of the present invention can be switched between the lock position where the shaft member is pushed into the grommet for the predetermined amount to expand the diameter of the leg portion, and the unlock position where the shaft member is further pushed in so as to return the leg portion to the original condition, in a reuse operation, the clip can always maintain excellent workability without being affected by a creep deformation even if the leg portion is creep-deformed in a diameter expansion direction. Namely, the clip of the invention ensures an excellent insertion property relative to the attachment hole for inserting the leg portion according to the first aspect, or the attachment hole of each member according to the second aspect by the guide portion inclining the extending tip side to the inside of the leg portion even if the leg portion is creep-deformed in the diameter expansion direction, and furthermore, the clip of the invention is hardly affected by a burr or the like formed in the attachment hole, thereby improving the workability at a reuse time.

BRIEF DESCRIPTION OF THE DRAWINGS

FIGS. 1(a) and 1(b) are schematic perspective views showing a clip in a state rotated by 90 degrees in a process wherein a shaft member is inserted into a grommet according to an embodiment of the present invention.

FIGS. 2(a), 2(b), 2(c), and 2(d) show the aforementioned grommet single item, wherein FIG. 2(a) is a front view; FIG. 2(b) is a half cross-sectional front view; FIG. 2(c) is a bottom view; and FIG. 2(d) is a half cross-sectional side view.

FIGS. 3(a), 3(b), and 3(c) show details of the grommet, wherein FIG. 3(a) is a cross-sectional view taken along a line A-A in FIG. 2(c); and FIGS. 3(b) and 3(c) are cross-sectional views taken along a line B-B and a line C-C of FIG. 2(d).

FIGS. 4(a), 4(b), and 4(c) show the aforementioned shaft member single item, wherein FIG. 4(a) is a front view; FIG. 4(b) is a side view; and FIG. 4(c) is a bottom view.

FIGS. 5(a), 5(b), and 5(c) show details of the shaft member, wherein FIG. 5(a) is a cross-sectional view taken along a line D-D of FIG. 4(a); and FIGS. 5(b) and 5(c) are cross-sectional views taken along a line E-E and a line F-F of FIG. 4(a).

FIGS. 6(a) and 6(b) show the aforementioned shaft member in an insertion condition inserted into the grommet, wherein FIGS. 6(a) and 6(b) are a front view and a side view showing the grommet in a half cross section as in FIGS. 2(a) and 2(b); and FIG. 6(c) is a partial view showing one portion of the shaft member shown in FIG. 6(a) in a condition without a half cross section.

FIGS. 7(a), 7(b), and 7(c) show the clip in a diameter-expansion condition of the grommet wherein the aforementioned shaft member is pushed into the grommet, wherein FIGS. 7(a) and 7(b) are a front view and a side view showing the grommet in a half cross section as in FIGS. 2(a) and 2(b); and FIG. 7(c) is a partial view showing one portion of the grommet and the shaft member shown in FIG. 7(a) in a condition without a half cross section.

FIGS. 8(a), 8(b), and 8(c) show the shaft member in a condition of being further pushed into the grommet, wherein FIGS. 8(a) and 8(b) are a front view and a side view showing the grommet in a half cross section as in FIGS. 2(a) and 2(b); and FIG. 8(c) is a partial view showing one portion of the grommet and the shaft member shown in FIG. 8(a) in a condition without a half cross section.

FIGS. 9(a) and 9(b) show a structure of Patent Document 1, wherein FIG. 9(a) shows FIG. 3 in the Patent Document 1; and FIG. 9(b) shows FIG. 4 in the Patent Document 1 in a state wherein explanatory notes are added in order to explain problems.

BEST MODES OF CARRYING OUT THE INVENTION

Figure 2A:
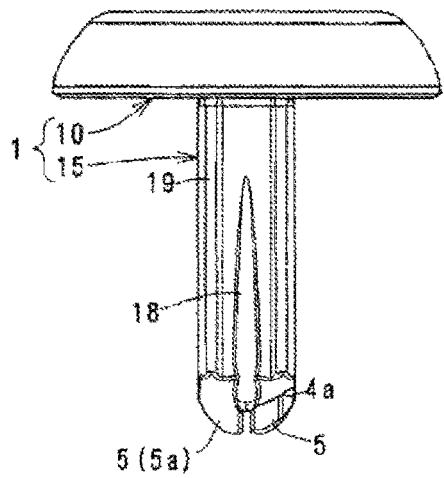

Hereinafter, an embodiment of the present invention will be explained with reference to FIG. 1(a) to FIG. 8(b). In this explanation, after a structure of a clip is described in detail, a main operation will be clarified.

(Structure) A clip 3 of the embodiment comprises a grommet 1 provided with a projecting portion 10, and a plurality of leg portions 15 diametrically expandably extending from the projecting portion; and a shaft member 2 provided with a head portion 20, and a shaft portion 25 extending from the head portion, and inserted into an inside of the leg portions from a through hole 13 provided in the projecting portion 10 to expand a diameter of the leg portions 15. The clip 3 is a type switchable between a lock position where the shaft member 2 is pushed into the grommet 1 for a predetermined amount to expand the diameter of the leg portions 15, and an unlock position where the shaft member 2 is further pushed in so as to return the leg portions 15 to an original condition.

First, as shown in FIGS. 1(a) and 1(b), FIGS. 2(a) to 2(d), and FIGS. 3(a) to 3(c), the grommet 1 is a resin molded member, and the projecting portion 10 includes a concave portion 11 provided at a center of an approximately disk shape, and the through hole 13 penetrating a bottom face 12 of the concave portion. Also, each leg portion 15 includes a leg-side convex portion 4 provided on an inside; a convex-portion wall face 4a forming one portion of the leg-side convex portion, and inclining in a leg-portion inward direction from a leg-portion tip side; a guide portion 5 extending to the leg-portion tip side from a leg-side-convex-portion forming portion forming the leg-side convex portion 4 in a state of being provided together with the leg-side convex portion; and a rib 18 provided on a tip-side outer periphery, and extending in a longitudinal direction.

Figure 2B:
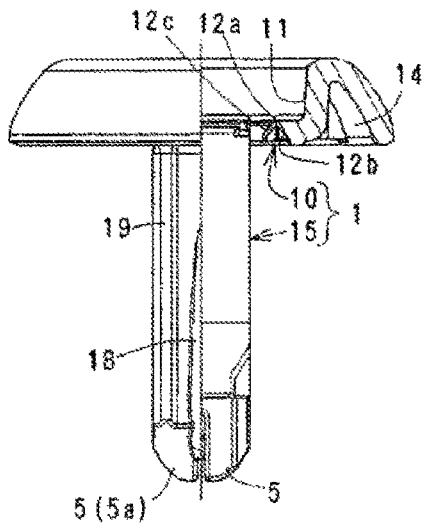
Figure 2C:
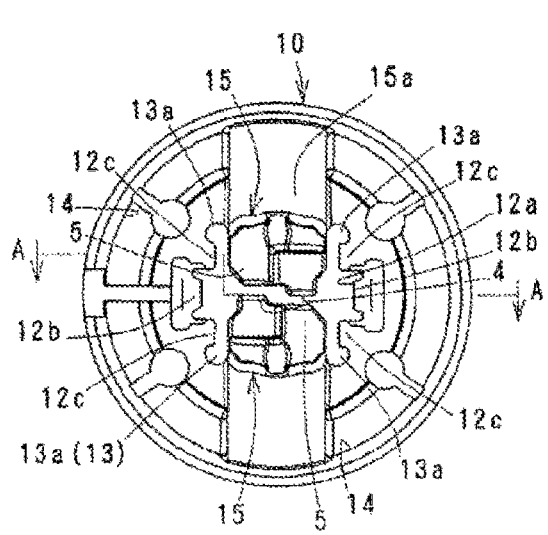

Among those, the concave portion 11 is formed in an approximately circular shape corresponding to the head portion of the shaft member. On the bottom face 12, there is provided the through hole 13 through which the shaft portion 25 of the shaft member passes, and a base portion of each leg portion 15 is connected to an opposed portion. The through hole 13 has an approximately rectangular shape, and includes four insertion holes 13a passing through both side portions of the base portion of each leg portion 15 to insert the later-described protruding portions 28 on a shaft portion side. Also, in a peripheral edge portion of the through hole 13, at portions not connected to the leg portion 15, and forming between the insertion holes 13a and 13a, there are provided fitting edge portions 12a into which the later-described claws 27a of elastic pieces 27 of the shaft portion fit; and four elastic control portions 12c forming between each insertion hole 13a and fitting edge portion 12a. As shown in FIG. 2(b) and FIG. 8(a), a lower face side of the fitting edge portion 12a forms a small space 12b provided in a notch state, wherein the claws 27a of the elastic pieces can be housed. Each elastic control portion 12c allows the later-described horizontal ribs 29a of the shaft portion to pass through accompanied by a swaying displacement so as to prevent the shaft member 2 from easily coming off from the grommet 1. The reference sign 14 represents a concave portion wherein one portion of a reverse face of the projecting portion 10 is notched. The reference sign 15a shown in FIGS. 1(a), 1(b), and 2(a) represents a base portion of the leg portion 15 connected to the bottom face 12.

Figure 3A:
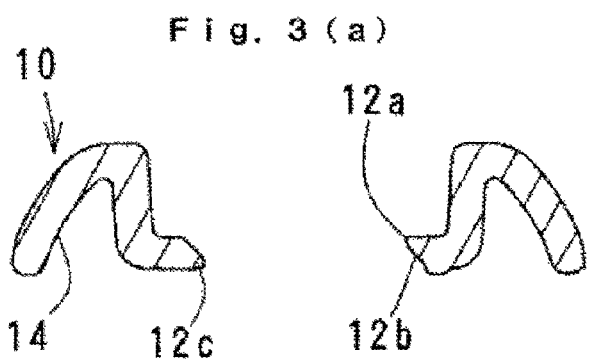
Figure 3B:
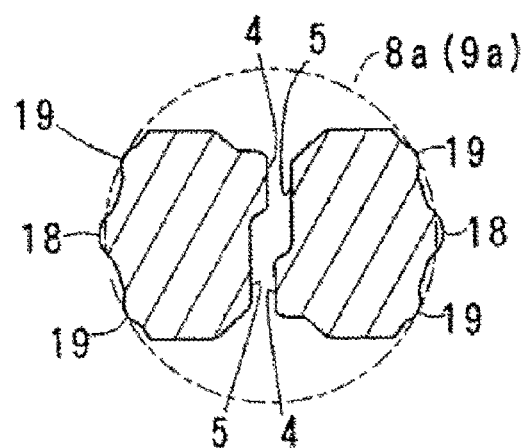

The leg portion 15 includes two leg portions disposed in an opposed state. As shown in FIG. 3(b), each leg portion 15 forms such that the leg-side convex portion 4 and the guide portion 5 are alternately disposed. In other words, each leg portion 15 has a relation wherein the leg-side convex portion 4 of one leg portion and the guide portion 5 on the other leg portion approximately face each other, and the guide portion 5 on one leg portion 15 and the leg-side convex portion 4 of the other leg portion approximately face each other. Also, the leg-side convex portion 4 and the guide portion 5 are located on a tip side of each leg portion 15, and provided on right and left of a plate portion forming the leg portion.

Figure 2D:
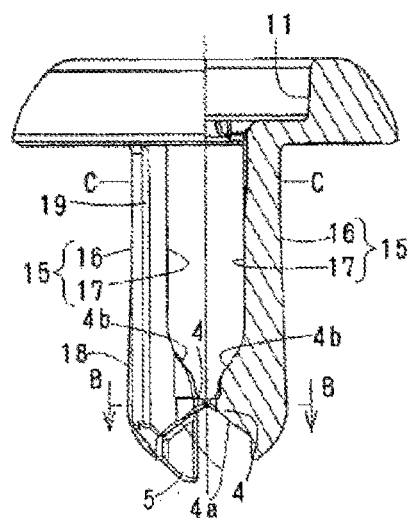

Then, the leg-side convex portion 4 projects from (one side) of a tip inner face of each leg portion 15, and a tip thereof protrudes up to near a middle of the leg portions. Also, as shown in FIG. 2(d), a lower end side of the leg-side convex portion 4 and the leg-portion tip side form the convex-portion wall face 4a inclining in the leg-portion inward direction from the leg-portion tip side. Namely, the convex-portion wall face 4a is an inclined face approaching an outer face 16 side from the inside as it separates from the leg-side convex portion 4. On the other hand, as shown in FIG. 2(d), an upper end side of the leg-side convex portion 4 and a projecting portion 10 side form a convex-portion wall face 4b inclining in a leg-side convex portion 4 direction from a leg-portion inner face 17. Namely, the convex-portion wall face 4b is an inclined face approaching the outer face 16 side from the inside as it separates from the leg-side convex portion 4.

Figure 3C:
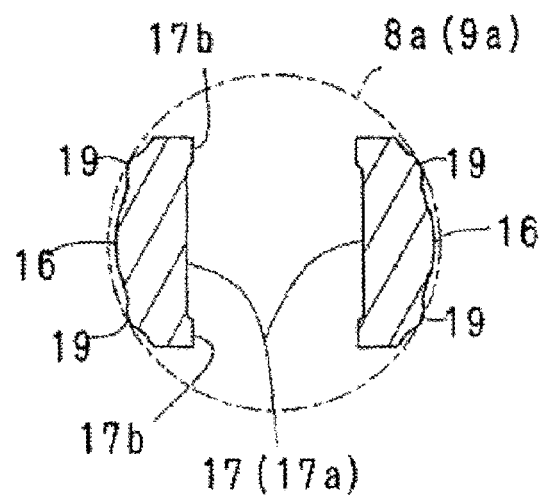

The guide portion 5 extends to the leg-portion tip side from the leg-side-convex-portion forming portion (convex-portion wall face 4a) in a state of being nearly provided with the leg-side convex portion 4, and forms an extending tip side thereof in an inclination portion 5a inclining to the inside of the leg portion in order to be easily inserted into the later-described attachment hole (see FIGS. 2(a) and 2(b)). The rib 18 is provided approximately in the middle of a width of the outer face 16 of the leg portion, and extends up to a slightly upper side than the middle of upper and lower parts of the leg portion from the tip of the leg portion. The reference sign 19 shown in FIG. 2(a) represents ribs provided on both sides of the outer face 16 of the leg portion, and extending up to just before the projecting portion 10 from the tip side. The reference sign 17b shown in FIG. 3(c) represents small ribs provided on both side portions except for intermediate portions 17a of the inner face 17 of the leg portion.

Next, as shown in FIGS. 1(a) and 1(b), FIGS. 4(a) and 4(b), and FIGS. 5(a) to 5(c), the shaft member 2 is a resin molded member, and includes the head portion 20, and the shaft portion 25 provided below the head portion 20. In the head portion 20, upper and lower faces 21 and 22 are flat (see FIG. 6(b)), and the head portion 20 is formed in an approximately disk shape with a size enough to be housed in the concave portion 11. The shaft portion 25 is formed in an approximately rectangular plate shape corresponding to the through hole 13 on a grommet side, and as shown in FIGS. 1(a) and 1(b), includes a shaft-side convex portion 6 projecting from the center of the lower face of the head portion, and engaging the leg-side convex portion 4 to expand the diameter of the leg portion 15; a groove-shaped release portion 7 relative to the guide portion 5; a concave portion 23 provided between the shaft-side convex portion 6 and the head portion 20, and engaging the leg-side convex portion 4 so as to return the leg portion 15 to the original condition from a diameter expansion; an abutment portion 23a abutting against the convex-portion wall face 4a; the protruding portions 28 and 28 controlling a relative rotation of the grommet 1; and the elastic pieces 27 coming to a fitting state of fitting into the fitting edge portions 12a on a projecting portion side in an engagement state between the leg-side convex portion 4 and the shaft-side convex portion 6.

Figure 4A:
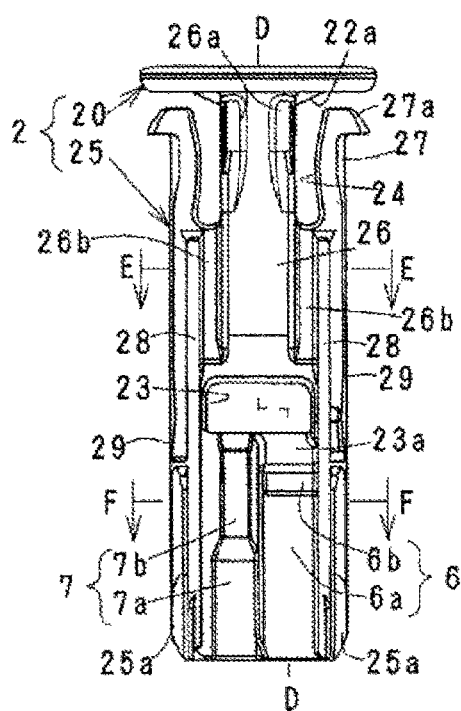
Figure 4B:
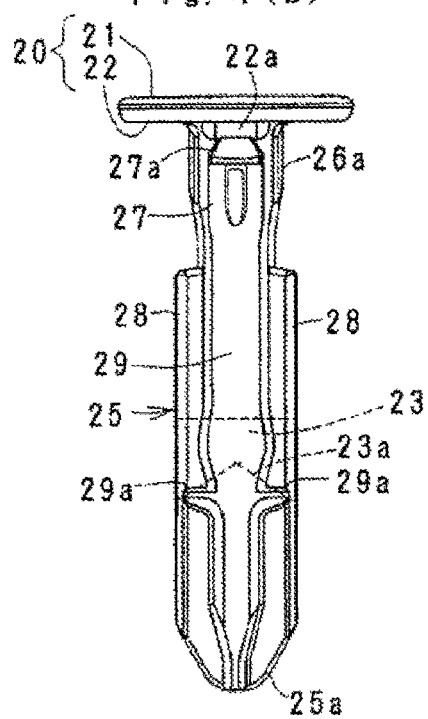
Figure 4C:
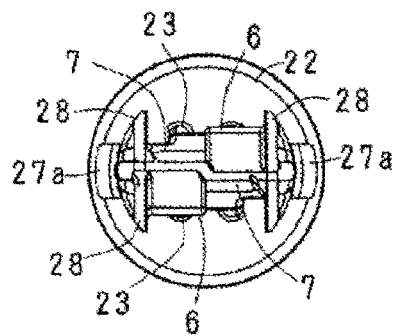
Figure 5A:
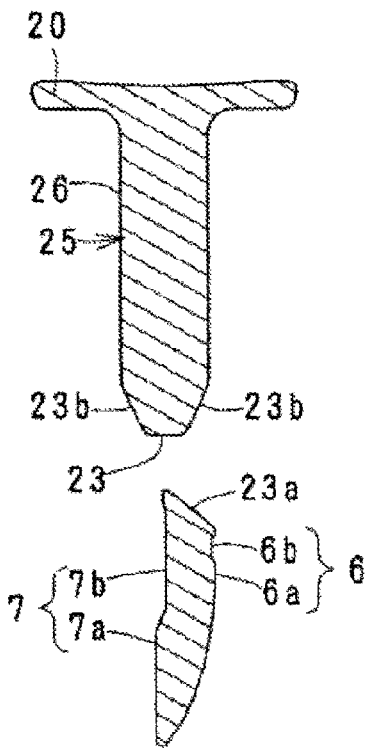
Figure 5B:
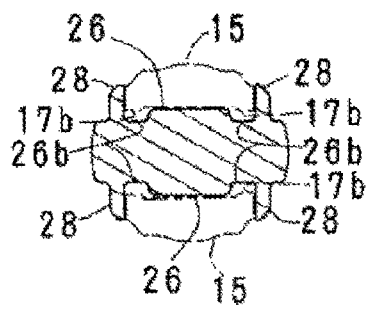

Among those, in the shaft portion 25, a base end is integrated with the center of the lower face of the head portion 20, and as shown in FIG. 4(b), tips of side faces are gradually narrowed at taper 25a. A pair of elastic pieces 27 is located on a head portion 20 side of an upper shaft portion 26 of the shaft portion 25, and provided through inverted L-shaped slits 24 respectively on right and left of the shaft portion. Each elastic piece 27 integrally forms the claw 27a on an upper end. In the upper shaft portion 26, there are provided small ribs 26a protruding along each slit 24; vertical grooves 26b provided on lower sides of the slits 24; and small projections 22a integrated with the lower face 22 of the head portion on an upper side of both side faces facing each claw 27a. For example, as shown in FIG. 7(b), the small rib 26a is pressed against a base end side of the leg portion 15 in the lock position where the diameter of the leg portion 15 is expanded by the shaft portion 25 so as to absorb a gap. As shown in FIG. 5(b), the vertical grooves 26b slidably fit into the small ribs 17b on a leg portion side for a guide. As shown in FIG. 8(a), the small projection 22a fits into the fitting edge portion 12a in a state wherein the claw 27a is housed in the small space 12b.

The protruding portions 28 and 28 are provided respectively as a pair on a front face and a back face of the shaft portion 25, and as shown in FIG. 6(a) to FIG. 7(b), the protruding portions 28 and 28 make the corresponding leg portion 15 in a slidably sandwiched state. The reference sign 29 represents vertical ribs provided along both sides of the shaft portion, and the reference sign 29a represents right and left, or horizontal ribs connected in one portion of the vertical ribs 29. Among those, as shown in FIGS. 6(a) and 6(b), when the shaft member 2 is initially inserted into the grommet 1, the vertical ribs 29 slide while abutting against the fitting edge portion 12a, and the right and left ribs 29a pass accompanied by elastic swaying of the fitting edge portion 12a. In the structure, it is formed in such a manner that once the horizontal ribs 29a pass the fitting edge portion 12a, even if the shaft member 2 is reversed upside down in relation to the grommet 1, the shaft member 2 cannot be easily detached from the grommet 1.

The shaft-side convex portion 6 and the release portion 7 are provided together on the right and left of a shaft tip side, and are alternately provided on a front face side and a back face side corresponding to the leg-side convex portion 4 and the guide portion 5. Namely, in the relation, as shown in FIG. 5(a), the shaft-side convex portion 6 on the front face or the right side, and the release portion 7 on the back face or the left side are provided back to back, and the release portion 7 on the front face or the left side, and the shaft-side convex portion 6 on the back face or the right side are provided back to back.

Also, each shaft-side convex portion 6 includes a projecting portion 6a smoothly projecting up to slightly before the abutment portion 23a of the concave portion 23 from a shaft portion tip in a side view; and a small hollow portion 6b provided just before the abutment portion 23a. Namely, in the structure, in a process wherein the shaft member 2 is pushed into the grommet 1 for the predetermined amount, the leg-side convex portion 4 relatively slides to a hollow portion 6b side from a tip of the projecting portion 6a so as to become the lock position where the diameter of the leg portion 15 is expanded, and maintain the lock position by engaging the leg-side convex portion 4 with the hollow portion 6b.

Figure 5C:
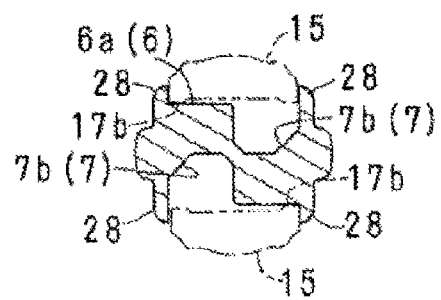
Figure 9A:
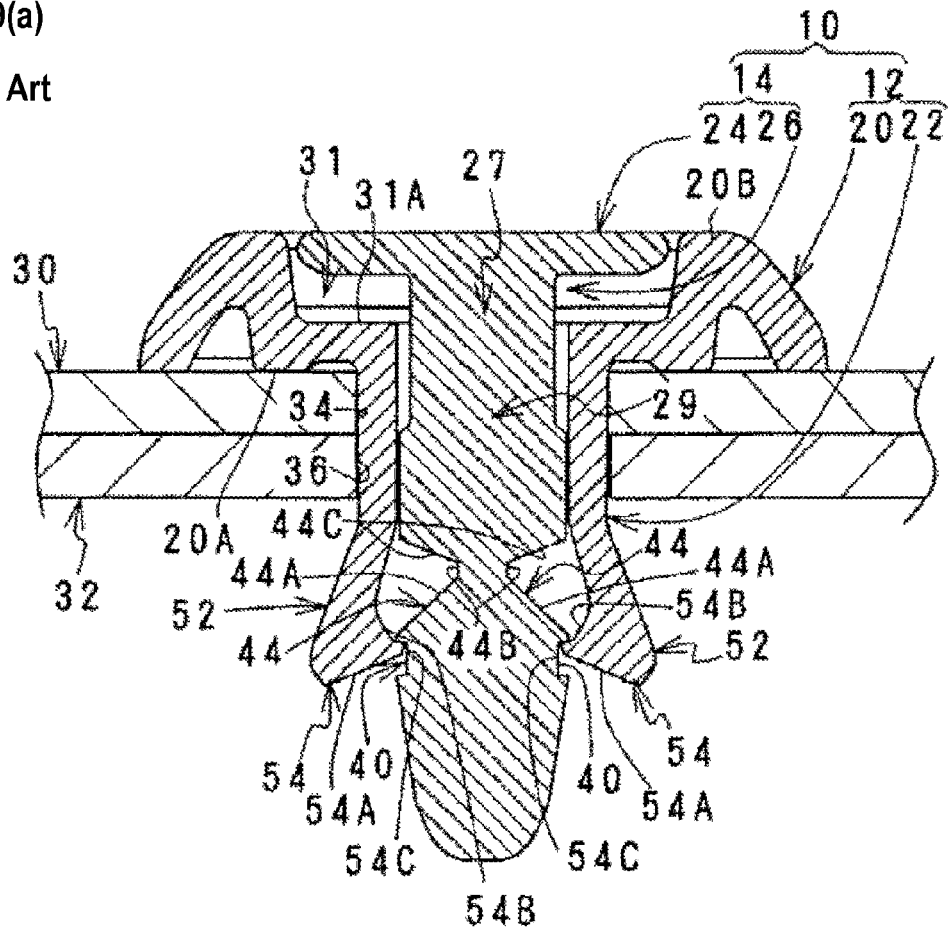
Figure 9B:
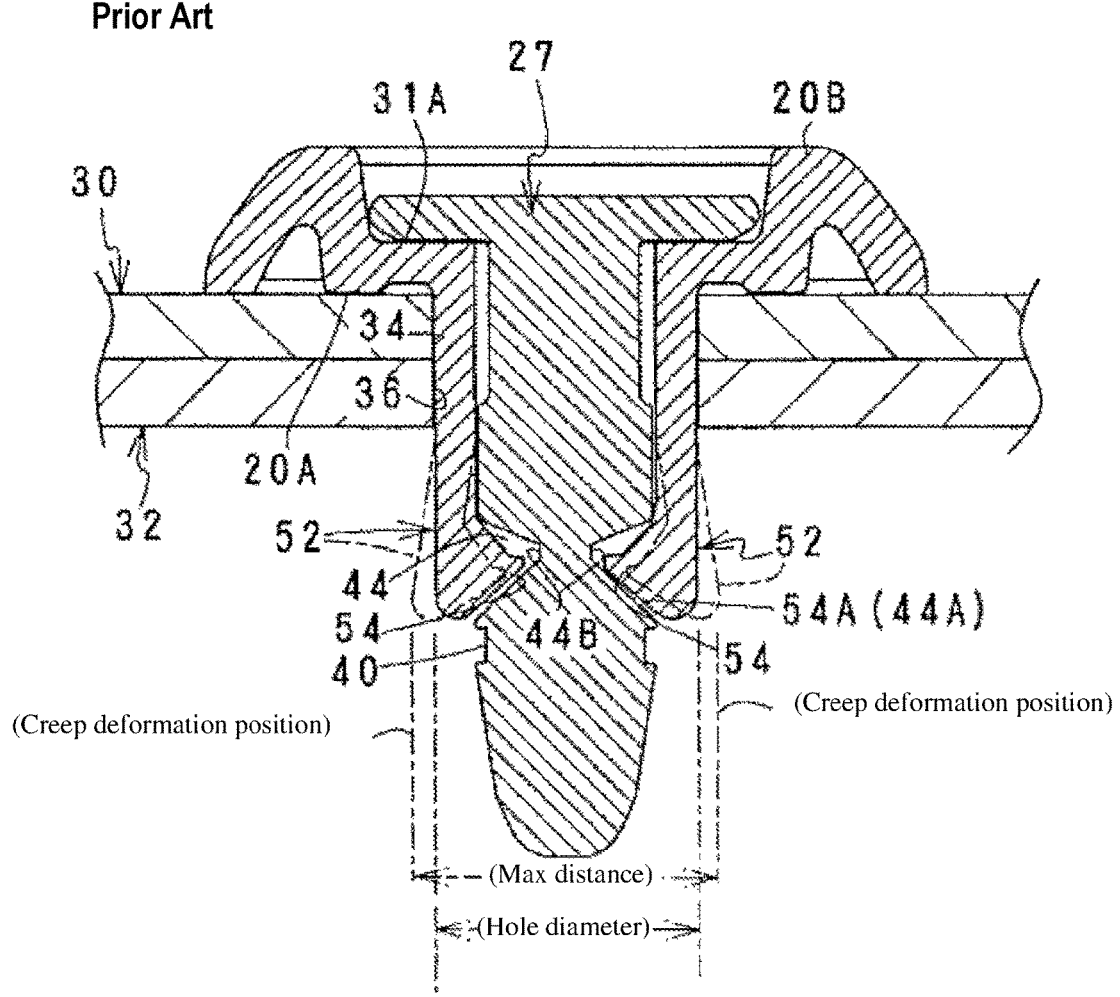

Each release portion 7 is formed by a guide groove 7a formed to be comparatively shallow up to a middle from the shaft portion tip; and a loose-fit groove 7b formed to be deep up to the guide groove 7a and slightly before the concave portion 23. The release portion 7 loosely fits or releases the corresponding guide portion 5 into the loose-fit groove 7b from the guide groove 7a by pushing the shaft member 2 into the grommet 1. Namely, in the structure, the leg-side convex portion 4 engages the concave portion 23 from the hollow portion 6b, and simultaneously, the guide portion 5 enters into the loose-fit groove 7b to be loosely fitted or released. Also, in the structure, as shown in FIG. 5(c), a depth of each release portion 7 reaches an approximately intermediate position of a thickness of the shaft portion 25, and the guide portion 5 or the leg-side convex portion 4 can be formed to be slightly larger according to the depth of the release portion 7.

The concave portion 23 is provided as a rectangular through hole between the upper shaft portion 26 or the vertical grooves 26b and the loose-fit groove 7b, and between the protruding portion 28 and the protruding portion 28 on both sides. The abutment portion 23a inclines toward an inside of the through hole of the concave portion 23 from an upper side of the hollow portion 6b. An upper side of the abutment portion 23a reaches the approximately intermediate position of the thickness of the shaft portion 25 as in the depth of each release portion 7. On the other hand, an upper end side of the through hole which is the concave portion 23 is an inclined face 23b inclining in an upper shaft portion 26 direction from the inside of the concave portion 23.

(Operation) Hereinafter, main operation characteristics of the aforementioned clip structure will be clarified with reference to FIG. 6(a) to FIG. 8(b).

(A) In the clip 3, as shown in FIGS. 1(a) and 1(b), when the shaft portion 25 of the shaft member is inserted into the through hole 13 from the concave portion 11 relative to the grommet 1, as mentioned above, the horizontal rib 29a of the shaft portion passes while swaying the elastic control portion 12c of the grommet, so that the shaft member 2 cannot be easily detached from the grommet 1, and comes to a temporary assembly condition in FIGS. 6(a) and 6(b). In the condition, the shaft member 2 is inserted into the inside between the leg portions 15 of the grommet, namely, the shaft member 2 is inserted until a tip of the shaft portion 25 nearly abuts against both of the leg-side convex portions and restricted. Each leg portion 15 is disposed in a state of being clamped between the corresponding protruding portions 28 and 28 of the shaft portion. Consequently, in the structure, for example, the relative rotation of the grommet 1 is prevented, and a movement of the shaft member 2 relative to the grommet 1 is limited in a linear direction.

(B) In a usage example in FIGS. 6(a) and 6(b), an attaching member 8 is superposed relative to an attached member 9 in a state wherein respective attachment holes 8a and 9a are matched, and the aforementioned clip 3 is inserted into the attachment holes 8a and 9a. In that case, in the clip 3, the maximum distance between the leg portions 15 is designed to a size insertable into a hole diameter X of the attachment holes 8a and 9a, so that until the projecting portion 10 abuts against a periphery of the attachment hole 8a of the attaching member, each leg portion 15 is inserted into the attachment holes 8a and 9a. Also, in the structure, as shown in FIG. 3(b), each leg portion 15 includes the ribs 18 and 19 provided on the tip-side outer periphery, and extending in the longitudinal direction, and contacts the attachment holes 8a and 9a through the ribs 18 and 19 so as to reduce a contact area through the ribs 18 and 19, and be hardly affected by a burr which can be easily formed in the attachment holes 8a and 9a, thereby improving workability.

(C) FIGS. 7(a) to 7(c) show the lock position wherein after each leg portion 15 is inserted into the attachment holes 8a and 9a in the aforementioned manner, the shaft member 2 is pushed into the grommet 1 for the predetermined amount to expand the diameter of the leg portions 15. In the structure, in the process wherein the shaft member 2 is pushed into the grommet 1 for the predetermined amount, while the shaft-side convex portion 6 abuts against the leg-side convex portion 4 to be slidingly contacting, each leg portion 15 is displaced in a diameter expansion direction by a projecting shape of the shaft-side convex portion 6. In the shaft member 2, the leg-side convex portion 4 engages the hollow portion 6b from the projecting portion 6a of the shaft-side convex portion so as to hold each leg portion 15 in a diameter-expansion condition thereof, namely, the lock position. In the diameter-expansion condition, each leg portion 15 is pushed against a hole wall side of the second attachment hole 9a, and comes to a state of clamping the attaching member 8 and the attached member 9 between a pushed portion thereof and the projecting portion 10, so that the attaching member 8 can be attached to the attached member 9, or the members 8 and 9 can be connected.

(D) FIGS. 8(a) to 8(c) show a state wherein the shaft member 2 is further pushed in from the lock position to be switched to the unlock position where the leg portion 15 can return to an original diameter-reduction condition from the diameter-expansion condition. In the structure, when the shaft member 2 is operated to be pushed in from the lock position in FIGS. 7(a) to 7(c), after the leg-side convex portion 4 is disengaged from the hollow portion 6b, the shaft member 2 abuts against the convex-portion wall face 4a which is the inclined face, and enters into the concave portion 23 while reducing the diameter from the diameter-expansion condition. At that time, the guide portion 5 enters into the loose-fit groove 7b from the guide groove 7a to be loosely fitted or released so as not to damage a diameter-reduction operation of each leg portion 15. In the structure, the concave portion 23 is the through hole, so that a protrusion dimension of the leg-side convex portion 4 can be relatively increased.

(E) Also, in the structure, when the shaft member 2 is operated to be pushed from the lock position, while the elastic piece 27 of the shaft member is swaying to be displaced, the claw 27a passes the fitting edge portion 12a on a concave-portion bottom face side, and is fitted into the small space 12b on a lower side thereof, so that in a process wherein the shaft member 2 is pushed in to be switched from the lock position to the unlock position, the elastic piece 27 passes the fitting edge portion 12a which is an edge portion of the through hole accompanied by an elastic deformation. Accordingly, an unlocking force becomes difficult to decline even by repeated operations, and when the elastic piece 27 passes accompanied by the deformation, a switching completion to the unlock position can be easily recognized by a click sound and the like.

(F) The aforementioned clip 3 is pulled out from the attachment holes 8a and 9a using the projecting portion 10 and the like from the condition in FIGS. 8(a) to 8(c). Then, in reuse, for example, the shaft member 2 is switched to the temporary assembly condition in FIGS. 6(a) to 6(c) relative to the clip 1 by pushing a shaft portion tip side in a pulling-out direction, or pulling using the head portion 20 protruding from the projecting portion 10. In that process, in the elastic piece 27, the fitting of the claw 27a is released from the small space 12b accompanied by the elastic deformation, and the elastic piece 27 fits in the fitting edge portion 12a again. At that time as well, in the structure, the switching completion can be easily recognized by a click sound of the elastic piece 27 and the like.

(G) Broken lines in FIGS. 6(b) and 8(b) of FIGS. 6(a) to 6(c) and FIGS. 8(a) to 8(c) show the leg portion 15 creep-deformed in the diameter expansion direction relative to the leg portion 15 shown by full lines. Conventionally, when the clip 1 is reused, if the leg portion 15 of the grommet is creep-deformed in the diameter expansion direction, an insertion operation to the attachment hole for inserting the leg portion was difficult. In this regard, the clip 3 of the embodiment can always maintain an excellent insertion property relative to the attachment holes 8a and 9a without being affected by the creep deformation even if the leg portion 15 is creep-deformed in the diameter expansion direction. Next, improved points thereof will be clarified.

Namely, in the aforementioned clip 3, as for a leg-portion structure of the grommet, each leg portion 15 provides the leg-side convex portion 4 and the guide portion 5 on the right and left or together. Also, the guide portion 5 extends from the convex-portion wall face 4a forming the leg-side convex portion 4, and the extending tip side thereof is formed in the inclination portion 5a inclining to the inside of the leg portion. Consequently, in the structure, even if each leg portion 15 is diametrically expanded by the creep deformation as shown by the dashed lines, a distance L between the inclination portions 5a inclining to the inside of the leg portion becomes smaller than the hole diameter X of the attachment holes 8a and 9a, and as a result, if the inclination portion 5a of each leg portion is smoothly inserted into the attachment holes 8a and 9a, and is operated to be pushed, the leg portion can be inserted in a single operation. This operation can maintain the excellent insertion property relative to the attachment holes 8a and 9a of each member, and furthermore, for example, even if there is a burr or the like in the attachment hole 8a, the operation is prevented from being affected by the burr or the like, and eliminates a workability decline factor at a reuse time, thereby improving the workability.

Incidentally, in the clip of the present invention, details can be modified or developed in reference to the embodiment provided that they include a structure specified in the following claims. As for an example thereof, the elastic piece and the like can be omitted or simplified, or conversely, in the condition in FIGS. 8(a) to 8(c), there may be provided a groove, a projection, or the like used when the grommet or the clip is pulled out from the attachment hole.

Incidentally, all contents of the specification, claims, drawings, and abstract of Japanese Patent Application No. 2013-194431 filed on Sep. 19, 2013 are cited in their entireties herein and are incorporated as a disclosure of the specification of the present invention.

What is claimed is:

1. A clip comprising:
a grommet having a projecting portion, and a plurality of leg portions diametrically expandably extending from the projecting portion; and
a shaft member including a head portion, and a shaft portion extending from the head portion, and being configured to be inserted into an inside of the leg portions from a through hole provided in the projecting portion so as to expand a diameter of the leg portions,
wherein the clip is configured to be switchable between a lock position where the shaft member is pushed into the grommet for a predetermined amount to expand the diameter of the leg portions, and an unlock position where the shaft member is further pushed in so as to return the leg portions to an original condition,
each leg portion includes a leg-side convex portion provided on an inner side of the plurality of leg portions; a convex-portion wall face extending from a leg-portion tip side to the leg-side convex portion; and a guide portion situated adjacent to the leg-side convex portion perpendicular to a longitudinal direction of the leg portion and extending to the leg-portion tip side, the guide portion having an extending tip inclined to the inside of the leg portion for easily inserting into an attachment hole for insertion of the leg portion, and
the shaft portion includes a shaft-side convex portion engaging the leg-side convex portion to expand the diameter of the leg portion; a concave portion provided between the shaft-side convex portion and the head portion, the concave portion, when engaging the leg-side convex portion, returning the leg portion to the original condition from expansion thereof; an abutment portion provided between the shaft-side convex portion and the concave portion for the convex-portion wall face; and a release portion for the guide portion, situated adjacent the shaft-side convex portion perpendicular to a longitudinal direction of the shaft portion.

2. A clip according to claim 1, wherein the grommet includes the projecting portion for abutting against a periphery of a first attachment hole bored in an attaching member; and the plurality of leg portions diametrically expandably extending from the projecting portion, and inserted into the first attachment hole and a second attachment hole bored in an attached member attaching or connecting the attaching member, and
the shaft member includes the head portion; and the shaft portion extending from the head portion, and inserted into the inside of the leg portions from the through hole provided in the projecting portion to expand the diameter of the leg portions so as to be pushed against a hole wall side of the second attachment hole.

3. A clip according to claim 1, wherein the attachment hole is a circular hole, and the leg portions are formed by two facing each other.

4. A clip according to claim 3, wherein each leg portion is provided such that the leg-side convex portion and the guide portion are respectively provided right-and-left alternately, and the shaft portion alternately provides release portions corresponding to guide portions on a different side, and a depth of the release portion reaches an approximately intermediate position of a thickness of the shaft portion.

5. A clip according to claim 1, wherein the concave portion is formed in the through hole.

6. A clip according to claim 1, wherein the shaft member includes a protruding portion extended in an axial direction of the shaft portion to restrict a relative rotation of the grommet.

7. A clip comprising:
- a grommet having a projecting portion, and a plurality of leg portions diametrically expandably extending from the projecting portion; and
- a shaft member including a head portion, and a shaft portion extending from the head portion, and being configured to be inserted into an inside of the leg portions from a through hole provided in the projecting portion so as to expand a diameter of the leg portions,
wherein the clip is configured to be switchable between a lock position where the shaft member is pushed into the grommet for a predetermined amount to expand the diameter of the leg portions, and an unlock position where the shaft member is further pushed in so as to return the leg portions to an original condition, each leg portion includes a leg-side convex portion provided on an inner side of the plurality of leg portions; a convex-portion wall face extending from a leg-portion tip side to the leg-side convex portion; and a guide portion situated adjacent to the leg-side convex portion and extending to the leg-portion tip side, the guide portion having an extending tip inclined to the inside of the leg portion for easily inserting into an attachment hole for insertion of the leg portion, the shaft portion includes a shaft-side convex portion engaging the leg-side convex portion to expand the diameter of the leg portion; a concave portion provided between the shaft-side convex portion and the head portion, the concave portion, when engaging the leg-side convex portion, returning the leg portion to the original condition from expansion thereof; an abutment portion provided between the shaft-side convex portion and the concave portion for the convex-portion wall face; and a release portion for the guide portion, and the shaft member includes an elastic piece provided in the shaft portion, and having a fitting state of fitting into an edge portion of the through hole on a projecting portion side in an engagement state between the leg-side convex portion and the shaft-side convex portion, and when the shaft member is pushed into the grommet further, the shaft member is adapted to pass the through hole accompanied by an elastic deformation to release the fitting of the fitting state.

* * * * *